(12) United States Patent
Sakamoto (10) Patent No.: US 7,877,993 B2
(45) Date of Patent: Feb. 1, 2011

(54) SHIFT OPERATING DEVICE FOR TRAVELING VEHICLE

(75) Inventor: Kunihiko Sakamoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 795 days.

(21) Appl. No.: 11/575,200

(22) PCT Filed: Sep. 28, 2004

(86) PCT No.: PCT/JP2004/014175

§ 371 (c)(1),
(2), (4) Date: Sep. 20, 2007

(87) PCT Pub. No.: WO2006/030535

PCT Pub. Date: Mar. 23, 2006

(65) Prior Publication Data

US 2008/0028882 A1     Feb. 7, 2008

(30) Foreign Application Priority Data

Sep. 13, 2004    (JP) .............................. 2004-265530

(51) Int. Cl.
*B60K 20/04* (2006.01)
*B60T 7/04* (2006.01)
(52) U.S. Cl. ..................................... 60/492; 74/473.17
(58) Field of Classification Search .................. 60/487, 60/492; 74/473.17, 478
See application file for complete search history.

(56) References Cited

U.S. PATENT DOCUMENTS

| | | | | |
|---|---|---|---|---|
| 3,500,633 | A | * | 3/1970 | Livezey ........................ 60/492 |
| 3,691,863 | A | * | 9/1972 | Shaffer ........................ 74/478 |
| 4,759,417 | A | | 7/1988 | Wanie et al. |
| 5,842,378 | A | | 12/1998 | Zellmer |
| 6,279,937 | B1 | * | 8/2001 | Hunt ........................... 74/481 |

(Continued)

FOREIGN PATENT DOCUMENTS

JP    47-15897    10/1972

(Continued)

OTHER PUBLICATIONS

International Search Report for International Application Serial No. PCT/JP2004/14175, mailed Jan. 11, 2005.

*Primary Examiner*—Thomas E Lazo
(74) *Attorney, Agent, or Firm*—Sterne, Kessler, Goldstein & Fox P.L.L.C.

(57)    ABSTRACT

The purpose of the invention is to simplify the linkage mechanism of a shift operating device and to unitize the shift operating device so as to improve the reliability of assemble accuracy. A forward traveling pedal and a rearward traveling pedal are rotatably supported by a installation plate; the installation plate rotatably supports a shift operating rotary sleeve connected through one link to the basal end of the forward traveling pedal (a forward traveling pedal rotary sleeve) and connected through one link to the basal end of the rearward traveling pedal (a rearward traveling pedal rotary sleeve); the forward traveling pedal, the rearward traveling pedal, the shift operating rotary sleeve and the installation plate are constructed as an integral unit; and the shift operating rotary sleeve is rotated forward and rearward interlockingly with the operation of the forward traveling pedal and the rearward traveling pedal so as to slant swash plates of a hydraulic pump and a hydraulic motor of a HST.

7 Claims, 9 Drawing Sheets

U.S. PATENT DOCUMENTS 6,886,677 B2 * 5/2005 Rupiper et al. ............ 74/473.17

FOREIGN PATENT DOCUMENTS

| | | |
|---|---|---|
| JP | 1-314627 | 12/1989 |
| JP | 5-61558 | 8/1993 |
| JP | 2002-114051 | 4/2002 |
| JP | 2004-24070 | 1/2004 |

* cited by examiner

SHIFT OPERATING DEVICE FOR TRAVELING VEHICLE

BACKGROUND OF THE INVENTION

1. Technical Field

The present invention relates to a shift operating device of a traveling vehicle.

2. Background Art

Conventionally, with regard to a traveling vehicle having a hydro static transmission (hereinafter, referred to as "HST"), there is a well known construction that a shift operating device, in which a forward traveling pedal and a rearward traveling pedal are separately disposed, is provided (for example, see the Patent Literature 1).

With regard to such a shift operating device, a rotary support shaft of the forward traveling pedal and a rotary support shaft of the rearward traveling pedal are provided while being shifted between their positions, and each of the rotary support shafts is connected to a control arm through a linkage mechanism. In the case that the forward traveling pedal is operated, the linkage mechanism rotates the control arm along the direction opposite to the case that the rearward traveling pedal is operated. By the rotation of the control arm, a control rod of the HST is operated so as to change the speed and reverse the traveling direction of the vehicle.

There is a well known construction that a neutral position of the forward traveling pedal and the rearward traveling pedal is set by a mechanism constructed by combining a neutral return spring, a cam follower and a cam (for example, see the Patent Literature 2).

Patent Literature 1: the U.S. Pat. No. 5,842,378
Patent Literature 2: the U.S. Pat. No. 4,759,417

However, with regard to the above-mentioned construction, the rotary support shafts of the forward traveling pedal and the rearward traveling pedal are provided while being shifted between their positions, whereby the linkage mechanism is complicated. By adjusting the angles of the pedals of the complicated linkage mechanism, many adjustment processes are required. The number of parts is many and influences manufacturing cost and the number of assembly processes.

The rotary support shafts of the forward traveling pedal and the rearward traveling pedal are provided while being shifted between their positions, it is difficult to secure arrangement space of the shafts in relation to the other devices.

With regard to the conventional mechanism setting the neutral position of the pedals, the structure is complicated. The power transmitted to the cam is dispersed at the contact point of the cam and the cam follower, whereby the transmission efficiency of the biasing force of the neutral return spring is not good. Accordingly, the setting of the neutral position is inaccurate.

BRIEF SUMMARY OF THE INVENTION

The purpose of the invention is to simplify the linkage mechanism of a shift operating device and to unitize the shift operating device so as to improve the reliability of assembly accuracy.

According to the present invention, with regard to a shift operating device of a traveling vehicle that a swash plate of hydraulic pump or a swash plate of a hydraulic motor of a HST is slanted by operating a forward traveling pedal and a rearward traveling pedal provided separately, the forward traveling pedal and the rearward traveling pedal are rotatably supported by an installation plate fixed to a vehicle frame; the installation plate rotatably supports a shift operating interlock rotary sleeve connected through one link to a basal end of the forward traveling pedal and through one link to a basal end of the rearward traveling pedal respectively; the shift operating interlock rotary sleeve is rotated forward and rearward interlockingly with operation of the forward traveling pedal and the rearward traveling pedal; a swash plate slant angle control mechanism, interlockingly connected to control arms linked with swash plates the hydraulic pump and the hydraulic motor of the HST, is interlocked with the shift operating interlock rotary sleeve; the swash plate slant angle control mechanism rotatably supports a first arm interlockingly connected through a first link to the control arm of the hydraulic motor and a second arm interlockingly connected through a second link to the control arm of the hydraulic pump, and a rotary member on a same axis; the rotary member is connected through one link to the shift operating interlock rotary sleeve and is rotated forward and rearward following the forward and rearward rotation of the shift operating interlock rotary sleeve; the first arm is rotated integrally with the rotary member and is in parallel to the first link when neither the forward traveling pedal nor the rearward traveling pedal are treaded so as to move the first link when either the forward traveling pedal or the rearward traveling pedal is treaded; and the second arm is interlocked with the rotary member so that the second arm is rotated to move the second link toward one side when the forward traveling pedal is treaded and to move the second link toward the other side when the rearward traveling pedal is treaded.

With regard to the shift operating device of the traveling vehicle according to the present invention, the forward traveling pedal and the rearward traveling pedal are pivotally connected to a rotary support shaft supported by the installation plate.

With regard to the shift operating device of the traveling vehicle according to the present invention, a neutral position return mechanism, which returns the forward traveling pedal and the rearward traveling pedal to a position at which tread amount is zero, is connected between the shift operating interlock rotary sleeve and the rotary member of the swash plate slant angle control mechanism.

With regard to the shift operating device of the traveling vehicle according to the present invention, a brake operation device is arranged on the installation plate.

With regard to the shift operating device of the traveling vehicle according to the present invention, an angle regulation member regulating an extent of rotary angle of the second arm is provided in the swash plate slant angle control mechanism.

With regard to the shift operating device of the traveling vehicle according to the present invention, a holding part holding the second arm is provided in the rotary member; a biasing member, biasing the second arm along the rotary direction in the case of treading when either the forward traveling pedal or the rearward traveling pedal is treaded, is interposed between the rotary member and the second arm; the angle regulation member regulates an extent of rotary angle of the rotary member along the biasing direction of the biasing member; the second arm is held by the holding part when neither the forward traveling pedal nor the rearward traveling pedal are treaded; when either the forward traveling pedal or the rearward traveling pedal is treaded, the second arm is rotated by a biasing force of the biasing member following the rotation of the rotary member until regulated by the angle regulation member, and after the regulation of the second arm by the angle regulation member, the rotary member is rotated by treading the pedal further so that the holding part releases the second arm; and when the other of the forward traveling pedal or the rearward traveling pedal is treaded, the holding part pushes the second arm against the biasing member by the rotation of the rotary member.

With regard to a shift operating device of a traveling vehicle that a swash plate of hydraulic pump or a swash plate of a hydraulic motor of a HST is slanted by operating a forward traveling pedal and a rearward traveling pedal provided separately, the forward traveling pedal and the rearward traveling pedal are rotatably supported by an installation plate fixed to a vehicle frame; the installation plate rotatably supports a shift operating interlock rotary sleeve connected through one link to a basal end of the forward traveling pedal and through one link to a basal end of the rearward traveling pedal respectively; and the shift operating interlock rotary sleeve is rotated forward and rearward interlockingly with operation of the forward traveling pedal and the rearward traveling pedal; a swash plate slant angle control mechanism, interlockingly connected to control arms linked with swash plates of the hydraulic pump and the hydraulic motor of the HST, is interlocked with the shift operating interlock rotary sleeve. Accordingly, the shift operating device comprising the forward traveling pedal and the rearward traveling pedal is assembled as a unit, whereby the reliability of the assemble accuracy is improved.

Furthermore, the link mechanism is simple so that the angle of the pedals can be adjusted easily.

The swash plate slant angle control mechanism rotatably supports a first arm interlockingly connected through a first link to the control arm of the hydraulic motor and a second arm interlockingly connected through a second link to the control arm of the hydraulic pump, and a rotary member on a same axis; the rotary member is connected through one link to the shift operating interlock rotary sleeve and is rotated forward and rearward following the forward and rearward rotation of the shift operating interlock rotary sleeve; the first arm is rotated integrally with the rotary member and is in parallel to the first link when neither the forward traveling pedal nor the rearward traveling pedal are treaded so as to move the first link when either the forward traveling pedal or the rearward traveling pedal is treaded; and the second arm is interlocked with the rotary member so that the second arm is rotated to move the second link toward one side when the forward traveling pedal is treaded and to move the second link toward the other side when the rearward traveling pedal is treaded. Accordingly, the swash plate of the hydraulic motor is interlocked with the actuation of the first arm so that when either the forward traveling pedal or the rearward traveling pedal is treaded, the swash plate is slanted along the same direction. On the other hand, the swash plate of the hydraulic pump is interlocked with the actuation of the second arm. Accordingly, the slant direction of the swash plate in the case of treading the forward traveling pedal is opposite to that in the case of treading the rearward traveling pedal.

The hydraulic motor and the hydraulic pump are steplessly shifted interlockingly with each other by operating the shift operating device. Accordingly, the shift operation is performed smoothly. Furthermore, the speed can be set optionally, whereby various setting of speed extends the extent of work.

The forward traveling pedal and the rearward traveling pedal are pivotally connected to a rotary support shaft supported by the installation plate. Accordingly, compared with the conventional construction providing rotary support shafts respectively, the number of parts is reduced so as to reduce the manufacture cost and assemble processes. It is necessary to secure space for only one rotary support shaft, whereby the device is miniaturized.

A neutral position return mechanism, which returns the forward traveling pedal and the rearward traveling pedal to a position at which tread amount is zero, is connected between the shift operating interlock rotary sleeve and the rotary member of the swash plate slant angle control mechanism. Accordingly, the neutral position, at which the angles (slant angles about the floor) of the forward traveling pedal and the rearward traveling pedal are the same, can be adjusted easily and can be set with high accuracy.

A brake operation device is arranged on the installation plate. Accordingly, the brake operation device is assembled as a unit, whereby the reliability of the assembly accuracy after imposing the device into the vehicle frame is improved.

An angle regulation member regulating an extent of rotary angle of the second arm is provided in the swash plate slant angle control mechanism. Accordingly, the swash plate of the hydraulic pump is prevented from being slanted over the maximum slant angle, whereby the damage of the HST is prevented.

A holding part holding the second arm is provided in the rotary member; a biasing member, biasing the second arm along the rotary direction in the case of treading when either the forward traveling pedal or the rearward traveling pedal is treaded, is interposed between the rotary member and the second arm; the angle regulation member regulates an extent of rotary angle of the rotary member along the biasing direction of the biasing member; the second arm is held by the holding part when neither the forward traveling pedal nor the rearward traveling pedal are treaded; when either the forward traveling pedal or the rearward traveling pedal is treaded, the second arm is rotated by a biasing force of the biasing member following the rotation of the rotary member until regulated by the angle regulation member, and after the regulation of the second arm by the angle regulation member, the rotary member is rotated by treading the pedal further so that the holding part releases the second arm; and when the other of the forward traveling pedal or the rearward traveling pedal is treaded, the holding part pushes the second arm against the biasing member by the rotation of the rotary member. Accordingly, the extent of rotary angle of the second arm can be regulated without regulating the extent of rotary angle of the first arm.

DETAILED DESCRIPTION OF THE INVENTION

Explanation will be given on an embodiment of the present invention according to the drawings.

In addition, hereinafter, forward traveling direction of a vehicle is regarded as the front side, and rightward direction as facing the front side is regarded as the right side. The upper side in FIG. 1 is regarded as the front side, and the right side therein is regarded as the right side.

Figure 1:
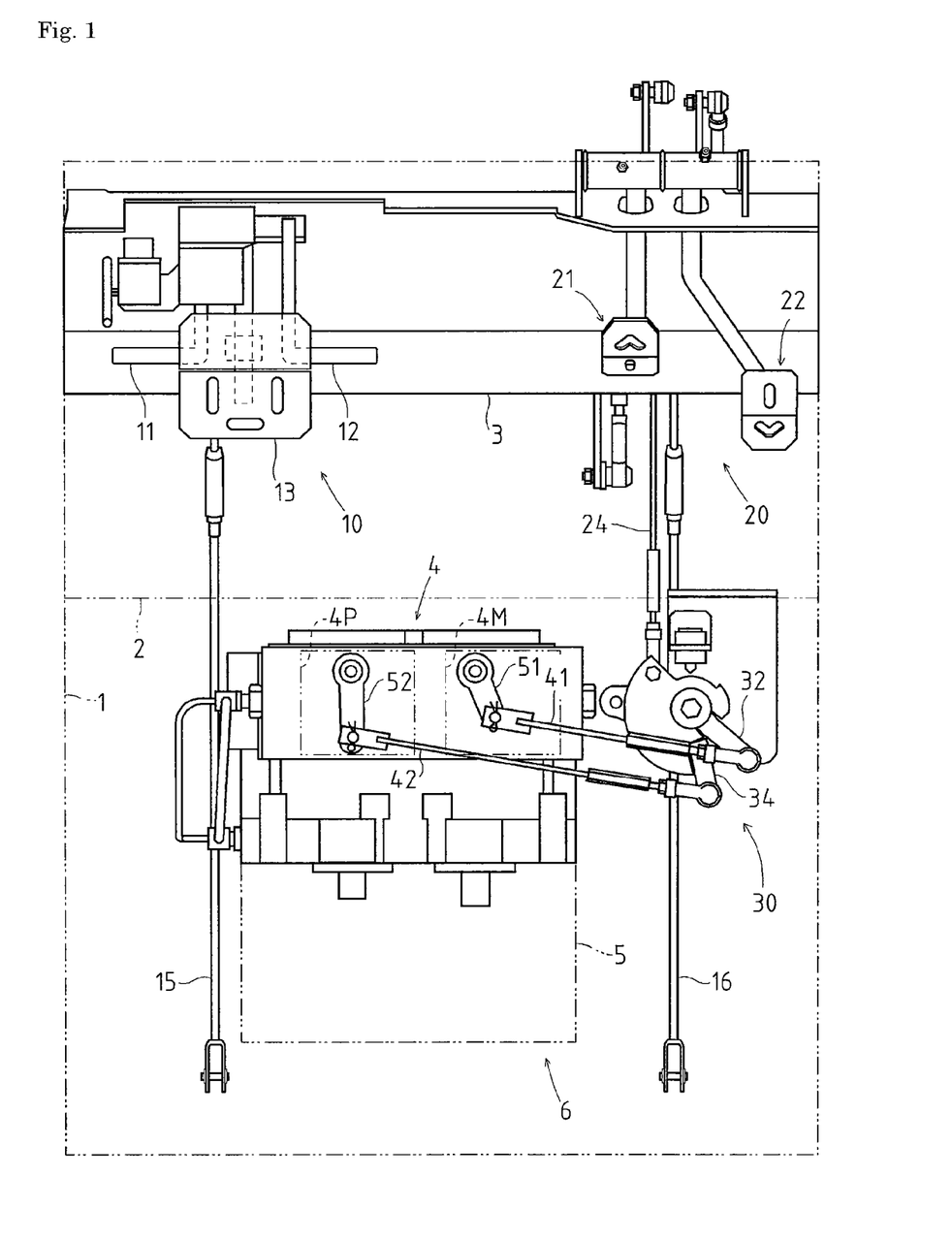
FIG. 1 is a drawing of a device construction for a shift operating device of a HST.

As shown in FIG. 1, a step 2 which is a footing for an operator is laid on a vehicle frame 1. Similarly, an installation plate 3 on which various pedals are installed is laid before the step 2. A HST 4 is arranged below and behind the step 2. A gearbox 5 in which planetary gear mechanism is disposed is arranged behind the HST 4. The HST 4 and the planetary gear mechanism constitute HMT 6 (Hydro Mechanical Transmission).

A brake operating device 10 is arranged at the left of the installation plate 3. The brake operating device 10 is provided therein with a left brake pedal 11, a right brake pedal 12, and a master brake pedal 13 for operating the brake pedals 11 and 12 simultaneously.

The brake pedals 11 and 12 are interlockingly connected to a brake device (not shown) respectively through links 15 and 16.

A shift operating device 20 which changes speed steplessly is disposed at the right of the installation plate 3. The shift operating device 20 is provided therein with a forward traveling pedal 21 and a rearward traveling pedal 22.

The forward traveling pedal 21 and the rearward traveling pedal 22 are connected to a swash plate slant angle control mechanism 30 through a link 24. The swash plate slant angle control mechanism 30 is connected through a pump control link 42 to a control arm 52 of a hydraulic pump 4P and is connected through a motor control link 41 to a control arm 51 of a hydraulic motor 4M.

Figure 2:
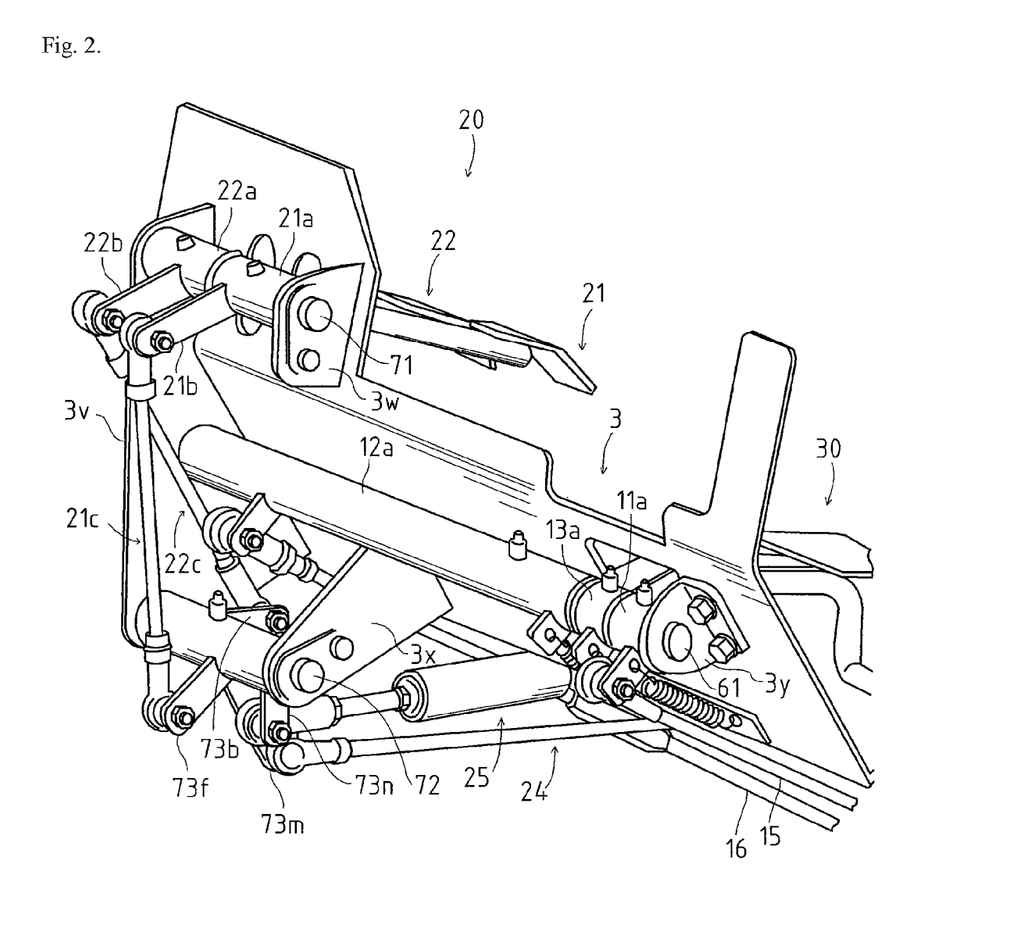
FIG. 2 is a drawing of the shift operating device which is unitized.

As shown in FIG. 2, a rotary support shaft 61, whose length is substantially the same as the lateral width of the installation plate 3, is provided laterally at the reverse side of the installation plate 3. The rotary support shaft 61 is hanged between a stay 3v projectingly provided in the left portion of the reverse side of the installation plate 3 and a stay 3y provided in the right portion thereof.

The rotary support shaft 61 rotatably supports a left brake rotary sleeve 11a to which the left brake pedal 11 is fixed, a right brake rotary sleeve 12a to which the right brake pedal 12 is fixed, and a master brake rotary sleeve 13a to which the master brake pedal 13 is fixed.

The link 15 is connected to the right end of the left brake rotary sleeve 11a, and the link 16 is connected to the right brake rotary sleeve 12a. Accordingly, each of the links 15 and 16 is operated independently following the operation of the left brake pedal 11 and the right brake pedal 12.

By operating the master brake pedal 13, the left brake pedal 11 and the right brake pedal 12 are operated simultaneously, and the links 15 and 16 are operated interlockingly.

Next, explanation will be given on the shift operating device 20.

Figure 3:
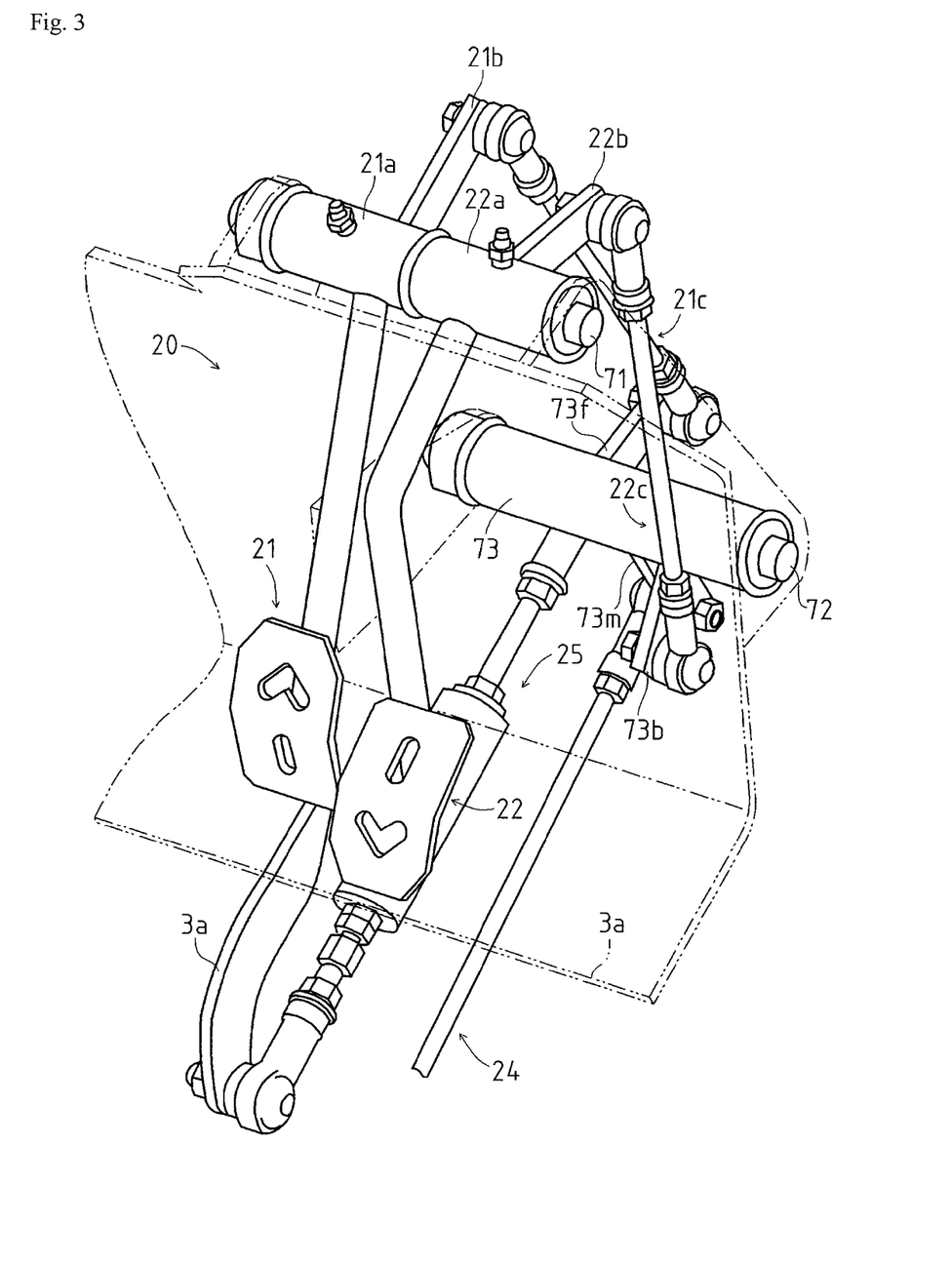
FIG. 3 is a perspective view of the shift operating device.
Figure 4:
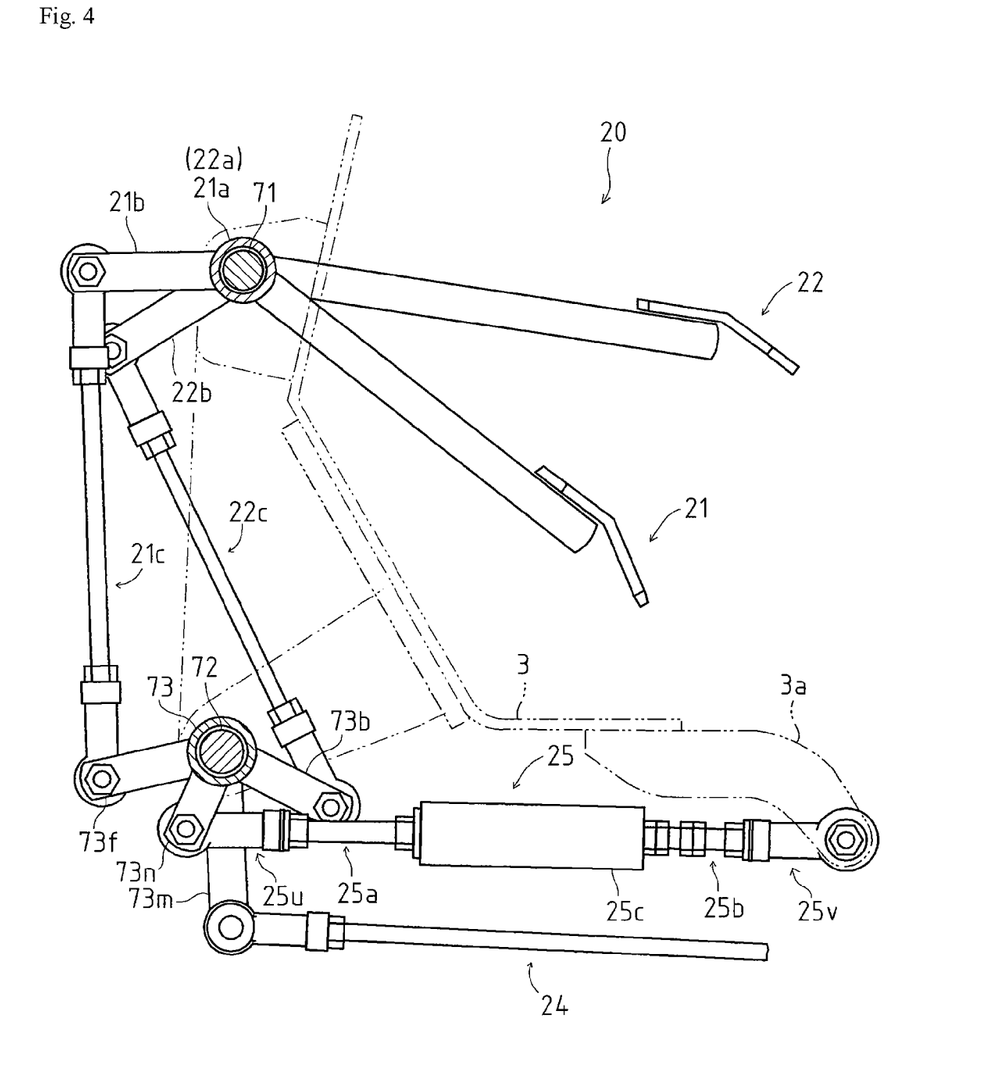
FIG. 4 is a side view partially in section of the same.

As shown in FIGS. 2 to 4, a first rotary support shaft 71 is provided laterally oppositely to the shift operating device 20 about the installation plate 3. The first rotary support shaft 71 rotatably supports a forward traveling pedal rotary sleeve 21a constituting the basal end of the forward traveling pedal 21 and a rearward traveling pedal rotary sleeve 22a constituting the basal end of the rearward traveling pedal 22. The first rotary support shaft 71 is supported by stays 3v and 3w projectingly provided in the reverse side of the installation plate 3.

A second rotary support shaft 72 is provided laterally below the first rotary support shaft 71 in the installation plate 3. The second rotary support shaft 72 rotatably supports a shift operating rotary sleeve 73. The second rotary support shaft 72 is supported by stays 3v and 3x projectingly provided in the installation plate 3.

An arm 21b is projectingly provided forward on the forward traveling pedal rotary sleeve 21a, an arm 73f is projectingly provided forward on the shift operating rotary sleeve 73, and the arms 21b and 73f are connected to each other through a link 21c. Accordingly, by treading the forward traveling pedal 21, the shift operating rotary sleeve 73 is rotated clockwise in FIG. 4. The length of the link 21c is adjustable so as to adjust the angle of the forward traveling pedal 21.

An arm 22b is projectingly provided forward on the forward traveling pedal rotary sleeve 21a, an arm 73b is projectingly provided rearward on the shift operating rotary sleeve 73, and the arm 22b and the arm 73b are connected to each other through a link 22c. Accordingly, by treading the rearward traveling pedal 22, the shift operating rotary sleeve 73 is rotated counterclockwise in FIG. 4. The length of the link 22c is adjustable so as to adjust the angle of the rearward traveling pedal 22.

An arm 73m is projectingly provided downward on the shift operating rotary sleeve 73, and the projected end of the arm 73m is connected to the tip of the link 24. The link 24 is moved forward by operating the forward traveling pedal 21 and moved rearward by operating the rearward traveling pedal 22, whereby the later-discussed swash plate slant angle control mechanism 30 is interlockingly operated.

Figure 5:
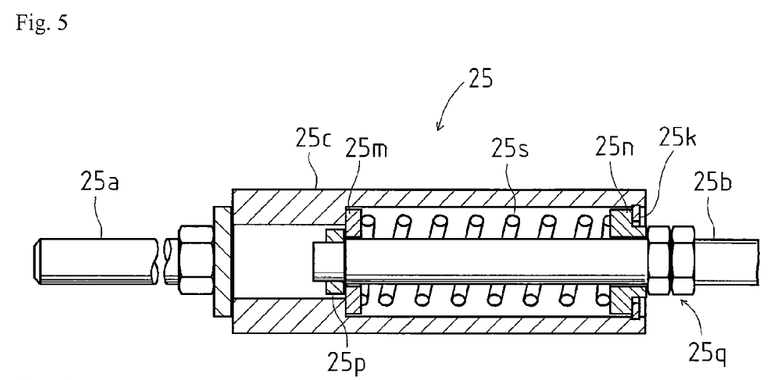
FIG. 5 is a sectional side view of a neutral return mechanism.

An arm 73n is projectingly provided downward on the shift operating rotary sleeve 73, and the projected end of the arm 73n is connected to a rod 25a of a neutral return mechanism 25. The neutral return mechanism 25 is constructed as shown in FIG. 25. The rear end of the rod 25a is fixed to a front portion of a cylinder 25c, and a rod 25b is projected rearward from the cylinder 25c. The rear end of the rod 25b is connected to a stay 3a extended from the installation plate 3. A spring 25s is provided in the cylinder 25c so that the rod 25b is biased rearward by the biasing force of the spring 25s.

The neutral return mechanism 25 is constructed as mentioned below.

In the cylinder 25c, the spring 25s is freely fitted onto the rod 25b and interposed between a retaining ring 25m, touching the inner wall surface of the cylinder 25c at the left side in the drawing, and a retaining ring 25n, freely fitted onto the rod 25b. The left end of the rod 25b is projected leftward from the retaining ring 25m, and the projected end thereof is fixed to a retaining ring 25p. A double nut 25q is fastened onto the rod 25b so as to regulate the retaining ring 25n biased rightward by the spring 25s. A retaining ring 25k is fixed to the inner perimeter of the right end of the cylinder 25c. By making the left side surface of the retaining ring 25k touch the retaining ring 25n, the retaining ring 25n is prevented from falling out.

As shown in FIG. 4, the rod 25a is connected to the arm 73n through a link connection body 25u, and the rod 25b is connected to the stay 3a through a link connection body 25v. By the link connection bodies 25u and 25v, the lengths of the rods 25a and 25b (the projection length from the link connection bodies 25*u* and 25*v*) are adjustable so as to adjust the overall length of the neutral return mechanism 25 connecting the arm 73*n* and the stay 3*a*.

Figure 6:
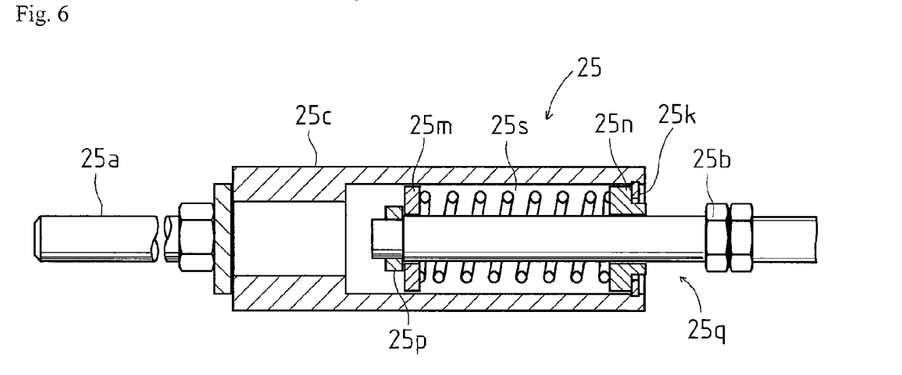
FIG. 6 is a sectional side view of the neutral return mechanism at the time of operating a forward traveling pedal.

With regard to the above-mentioned construction, when the forward traveling pedal 21 is operated, the rod 25*a* is pulled forward and the state shown in FIG. 6 is realized. When the forward traveling pedal 21 is released, the rod 25*a* is returned to the state shown in FIG. 5.

Figure 7:
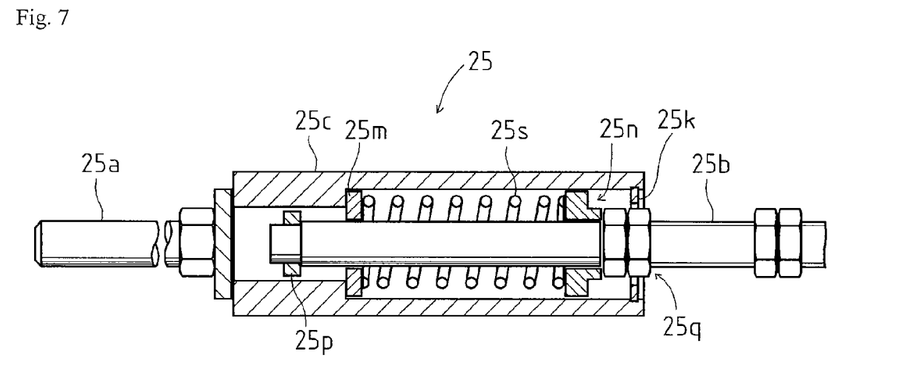
FIG. 7 is a sectional side view of the neutral return mechanism at the time of operating a rearward traveling pedal.
Figure 8:
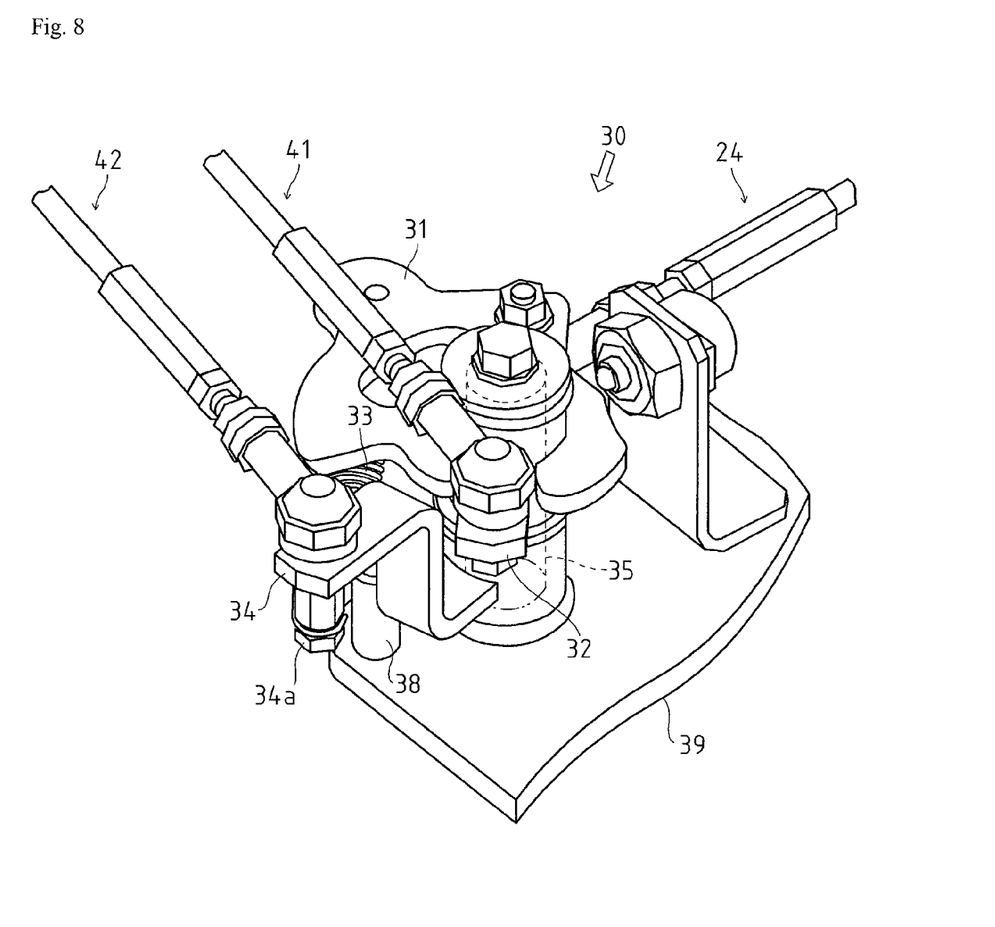
FIG. 8 is a perspective view of a swash plate slant angle control mechanism.

When the rearward traveling pedal 22 is operated, the rod 25*a* is pushed rearward and the state shown in FIG. 7 is realized. When the forward traveling pedal 21 is released, the rod 25*a* is returned to the state shown in FIG. 5.

By adjusting the overall length of the neutral return mechanism 25, the angle of the arm 73*n*, that is, the angular position of the shift operating rotary sleeve 73 is determined. Accordingly, the angles of the forward traveling pedal 21 and the rearward traveling pedal 22 (the slant angles about the floor), interlocked with the angular position of the shift operating rotary sleeve 73, are adjusted. For example, the angles of the pedals 21 and 22 in the neutral state can be equalized.

The construction of the shift operating device 20 according to the present invention is mentioned above.

With regard to the above-mentioned construction, the forward traveling pedal 21 and the rearward traveling pedal 22 are rotatably supported by the installation plate 3; the installation plate 3 rotatably supports the shift operating rotary sleeve 73 connected through one link 21*c* to the basal end of the forward traveling pedal 21 (the forward traveling pedal rotary sleeve 21*a*) and connected through one link 22*c* to the basal end of the rearward traveling pedal 22 (the rearward traveling pedal rotary sleeve 22*a*); the forward traveling pedal 21, the rearward traveling pedal 22, the shift operating rotary sleeve 73 and the installation plate 3 are constructed as an integral unit; and the shift operating rotary sleeve 73 is rotated forward and rearward interlockingly with the operation of the forward traveling pedal 21 and the rearward traveling pedal 22 so as to slant the swash plates of the hydraulic pump and the hydraulic motor of the HST 4.

With regard to this construction, the shift operating device 20 comprising the forward traveling pedal 21 and the rearward traveling pedal 22 is assembled as a unit, whereby the reliability of the assembly accuracy after imposing the device into the vehicle frame 1 is improved.

Furthermore, the link mechanism is simple so that the angle of the pedals can be adjusted easily.

The forward traveling pedal 21 and the rearward traveling pedal 22 are pivotally connected to the rotary support shaft 71 supported by the installation plate 3.

With regard to this construction, one rotary support shaft 71 acts as both the rotary support shaft of the forward traveling pedal 21 and the rotary support shaft of the rearward traveling pedal 22, whereby the number of parts is reduced so as to reduce the manufacture cost and assembly processes compared with the conventional construction providing rotary support shafts respectively. It is necessary to secure space for only one rotary support shaft, whereby the device is miniaturized.

The neutral return mechanism 25, which returns the forward traveling pedal 21 and the rearward traveling pedal 22 to the position at which the tread amount is zero, is connected to the shift operating rotary sleeve 73. According to this construction, the neutral position, at which the angles of the forward traveling pedal 21 and the rearward traveling pedal 22 are the same, can be adjusted easily.

The biasing force of the spring 25*s* acts directly on the shift operating rotary sleeve 73 through the rod 25*a*, whereby the neutral position is set with high accuracy.

The master brake pedal 13 operating the left brake pedal 11, the right brake pedal 12, or the pedals 11 and 12 simultaneously is rotatably supported by the installation plate 3. The rotary support shaft 61 rotatably supporting the pedals is supported by the installation plate 3. The left brake pedal 11, the right brake pedal 12, the master brake pedal 13 and the installation plate 3 are constructed as an integral unit.

With regard to this construction, the brake operating device 10 is assembled as a unit, whereby the reliability of the assemble accuracy after imposing the device into the vehicle frame 1 is improved.

Next, explanation will be given on the swash plate slant angle control mechanism 30.

As shown in FIG. 1, the forward traveling pedal 21 and the rearward traveling pedal 22 of the shift operating device 20 are interlockingly connected respectively to the control arm 51 of the hydraulic motor 4M and the control arm 52 of the hydraulic pump 4P of the HST through the swash plate slant angle control mechanism 30.

As shown in FIGS. 8 to 11, the shift operating device 20 is interlockingly connected respectively to the control arms 51 and 52 of the hydraulic motor 4M and the hydraulic pump 4P of the HST through the swash plate slant angle control mechanism 30. The swash plate slant angle control mechanism 30 comprises a first arm 32 interlockingly connected to the control arm 51 of the hydraulic motor 4M and a second arm 34 interlockingly connected to the control arm 52 of the hydraulic pump 4P. The first and second arms are rotatably supported on the same axis (a rotary support shaft 35) and act in cooperation with each other.

Figure 9:
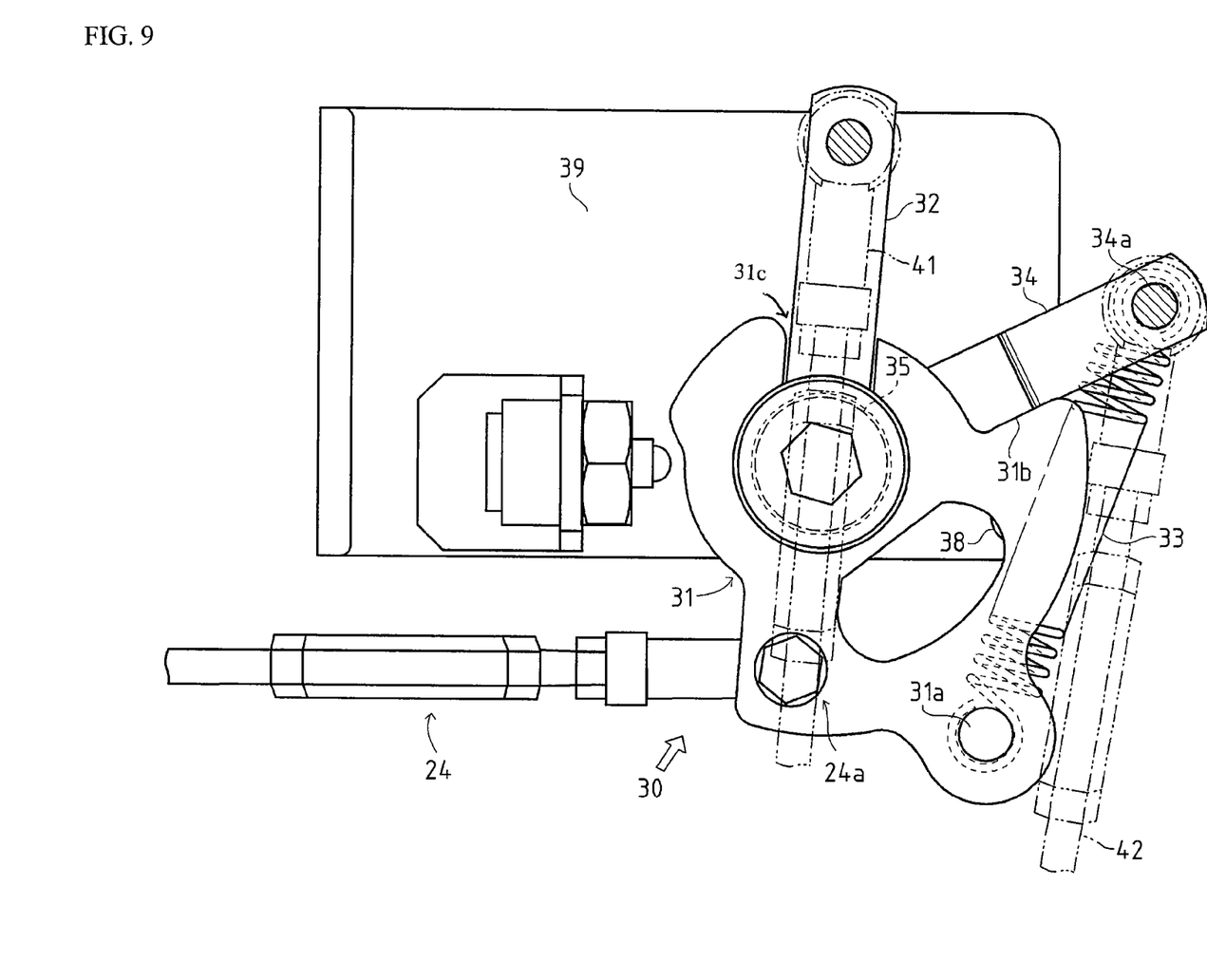
FIG. 9 is a plan view of the swash plate slant angle control mechanism at the time that both the forward traveling pedal and the rearward traveling pedal are not treaded.
Figure 10:
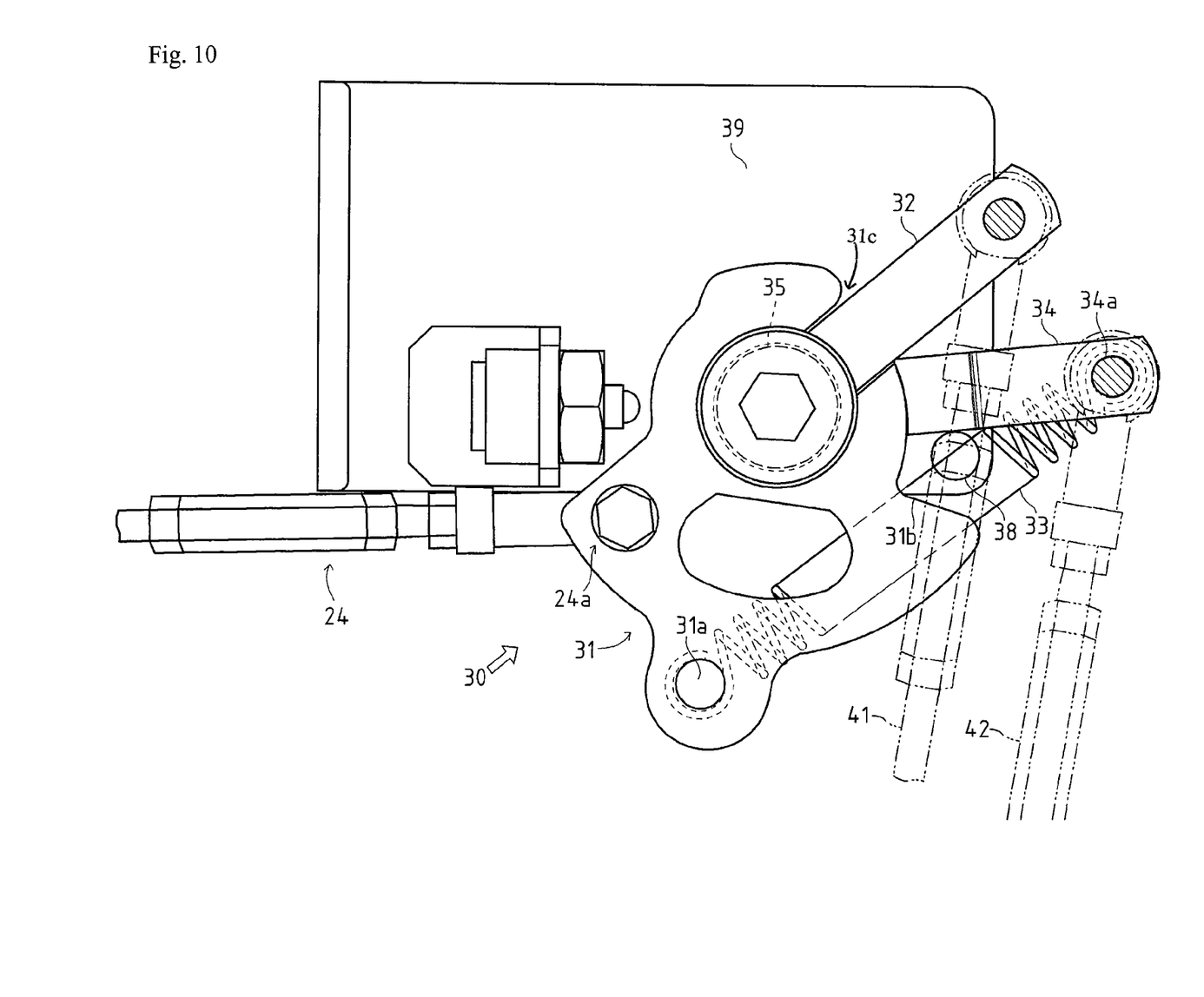
FIG. 10 is a plan view of the swash plate slant angle control mechanism at the time of operating the forward traveling pedal.
Figure 11:
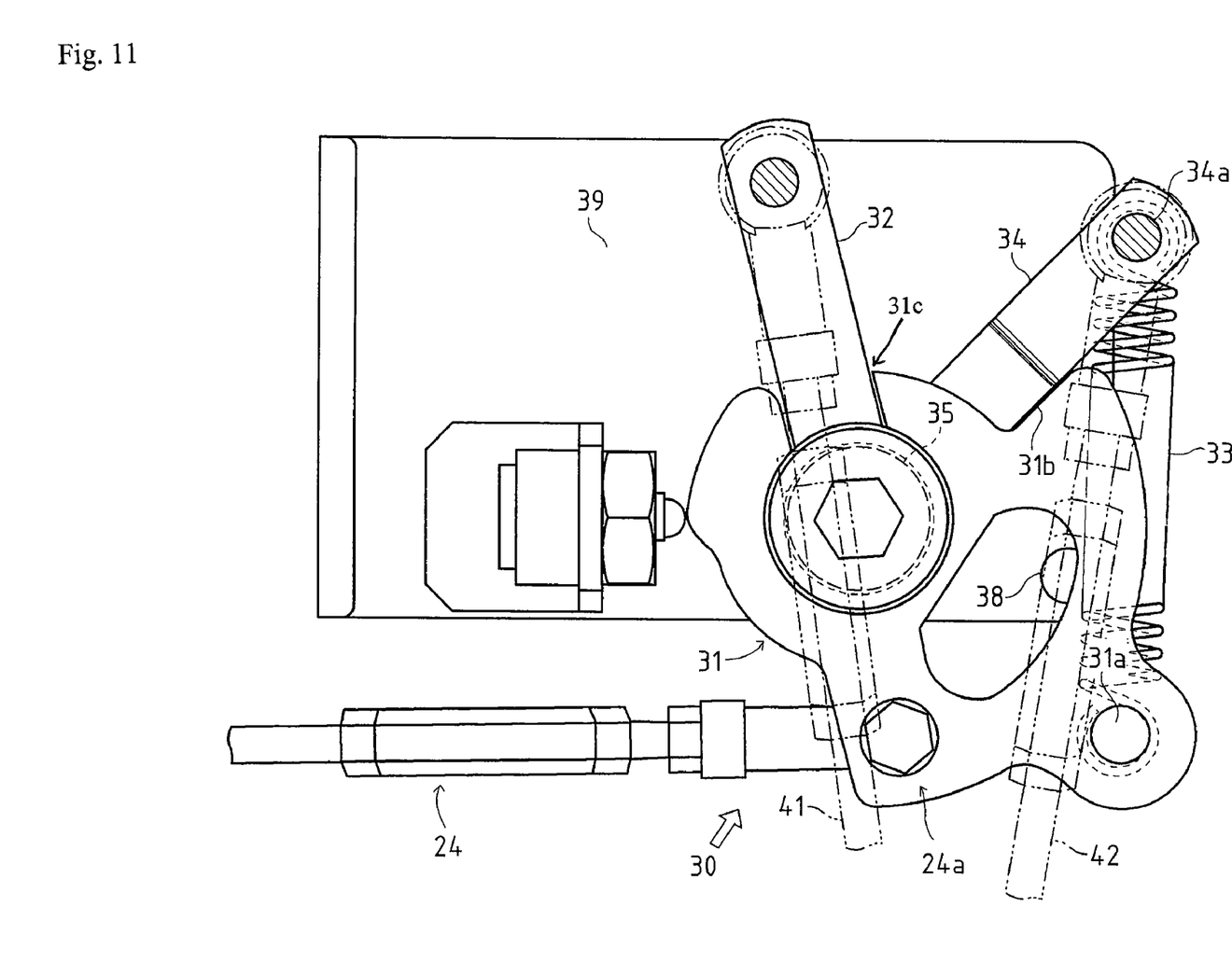
FIG. 11 is a plan view of the swash plate slant angle control mechanism at the time of operating the rearward traveling pedal.

Detailed explanation will be given below. The rotary support shaft 35 is provided vertically on a stay 39 fixed to the vehicle frame 1. A rotary plate 31, the first arm 32 and the second arm 34 are rotatably supported by the rotary support shaft 35 in this order from upper to lower. The rear end of the link 24 connected to the shift operating rotary sleeve 73 of the shift operating device 20 is connected to the rotary plate 31. FIG. 9 shows the case that the shift operation is not performed (the forward traveling pedal 21 and the rearward traveling pedal 22 are not treaded). In this state, when the forward traveling pedal 21 is treaded, the rotary plate 31 is rotated clockwise in the drawing as shown in FIG. 10. When the rearward traveling pedal 22 is treaded, the rotary plate 31 is rotated counterclockwise in the drawing as shown in FIG. 11.

When viewed in plan, the first arm 32 is extended oppositely to a connection part 24*a* of the link 24 about the rotary support shaft 35. The first arm 32 is pinched by a notched part 31*c* of the rotary plate 31 so as to be rotated integrally with the rotary plate 31. FIG. 10 shows the state that the forward traveling pedal 21 is treaded and the link 24 is moved forward so that the first arm 32 is rotated clockwise in the drawing. FIG. 11 shows the state that the rearward traveling pedal 22 is treaded and the link 24 is moved rearward so that the first arm 32 is rotated counterclockwise in the drawing.

The tip of the first arm 32 is connected to the tip of the motor control link 41 so that the control arm 51 of the hydraulic motor 4M is actuated interlockingly with the rotary operation of the first arm 32. By the actuation of the control arm 51, the slant angle of the swash plate of the hydraulic motor 4M is changed.

It is designed so that the first arm 32 and the motor control link 41 are in parallel to each other when the pedals are not operated (the forward traveling pedal 21 and the rearward traveling pedal 22 are not treaded) (see FIG. 9). Accordingly, when either the forward traveling pedal 21 or the rearward traveling pedal 22 is treaded, the motor control link 41 is moved along the same direction and the control arm 51 is operated along the same direction.

When viewed in plan, the second arm 34 is extended at the position clockwise from the first arm 32, between the first arm 32 and the link 24. One of the ends of a spring 33 is held by a holding pin 34a extended downward from the tip of the second arm 34. A holding pin 31a is projectingly provided downward at the position of the rotary plate 31 clockwise from the second arm 34, between the second arm 34 and the link 24. The other end of the spring 33 is held by the holding pin 31a. Accordingly, when the rotary plate 31 is rotated clockwise in the drawing, tractive force is generated on the spring 33 so that the second arm 34 is rotated clockwise (the state shown in FIG. 10 that the forward traveling pedal 21 is treaded).

An engaged part 31b, which is engaged with the side surface of the second arm 34, is provided at the position of the rotary plate 31 clockwise from the second arm 34, between the second arm 34 and the link 24. Accordingly, when the rotary plate 31 is rotated counterclockwise in the drawing and the engaged part 31b touches the second arm 34, the second arm 34 is rotated counterclockwise integrally with the rotary plate 31 (the state shown in FIG. 11 that the rearward traveling pedal 22 is treaded).

The tip of the second arm 34 is connected to the tip of the pump control link 42 so that the control arm 52 of the hydraulic pump 4P is actuated interlockingly with the rotary operation of the second arm 34. By the actuation of the control arm 52, the slant angle of the swash plate of the hydraulic pump 4P is changed.

With regard to this construction, the swash plate of the hydraulic motor 4M is interlocked with the actuation of the first arm 32. Accordingly, when either the forward traveling pedal 21 or the rearward traveling pedal 22 is treaded, the swash plate is slanted along the same direction.

On the other hand, the swash plate of the hydraulic pump 4P is interlocked with the actuation of the second arm 34. Accordingly, the slant direction of the swash plate in the case of treading the forward traveling pedal 21 is opposite to that in the case of treading the rearward traveling pedal 22.

As mentioned above, the first arm 32 and the second arm 34 are rotatively operated interlockingly with the tread of the forward traveling pedal 21 or the rearward traveling pedal 22 so as to change the slant angles of the swash plates of the hydraulic motor 4M and the hydraulic pump 4P of the HST 4, whereby the speed is set and the traveling direction is reversed.

With regard to this construction, the three rotary members, the rotary plate 31, the first arm 32 and the second arm 34 are supported by one rotary support shaft 35. Accordingly, compared with the case that these rotary members are supported by respective shafts, the number of parts is reduced and the device is constructed compactly.

The first arm 32 and the second arm 34 are actuated interlockingly with each other by the spring 33 and the engaged part 31b, whereby the hydraulic motor 4M and the hydraulic pump 4P are steplessly shifted interlockingly with each other by operating the shift operating device 20. Accordingly, the shift operation is performed smoothly. Furthermore, the speed can be set optionally, whereby various setting of speed extends the extent of work.

An angle regulation member 38 regulating the extent of rotary angle of the second arm 34 is provided in the swash plate slant angle control mechanism 30.

Since maximum slant angle of the swash plate of the hydraulic pump is set, the swash plate cannot be slanted in excess of the maximum slant angle. Accordingly, the rotary angle of the second arm 34 is necessary to be in the extent that makes the slant angle of the swash plate of the hydraulic pump the maximum. If the second arm 34 is rotated in excess of the extent, the HST 4 may be broken.

With regard to this construction, it is necessary to regulate the clockwise rotary angle of the second arm 34. Accordingly, the angle regulation member 38 is provided at the position clockwise from the second arm 34 and between the second arm 34 and the holding pin 31a when viewed in plan.

Accordingly, when the forward traveling pedal 21 is treaded and the second arm 34 is moved clockwise in the drawing and touches the angle regulation member 38, the rotation of the second arm 34 is regulated.

When the second arm 34 touches the angle regulation member 38, the rotary plate 31 and the second arm 34 are isolated from each other so that only the rotary plate 31 is rotated and the first arm 32 is rotated independently. Accordingly, only the extent of rotary angle of the second arm 34 is regulated without regulating the extent of rotary angle of the first arm 32.

By regulating the extent of rotary angle of the second arm 34 as mentioned above, the damage of the HST is prevented.

What is claimed is:

1. A shift operating device of a traveling vehicle that slants a swash plate of a hydraulic pump or a swash plate of a hydraulic motor of a HST by operating a forward traveling pedal and a rearward traveling pedal provided separately, characterized in that:

the forward traveling pedal and the rearward traveling pedal are rotatably supported by an installation plate fixed to a vehicle frame;

the installation plate rotatably supports a shift operating interlock rotary sleeve connected through one link to a basal end of the forward traveling pedal and through one link to a basal end of the rearward traveling pedal respectively;

the shift operating interlock rotary sleeve is rotated forward and rearward interlockingly with operation of the forward traveling pedal and the rearward traveling pedal;

a swash plate slant angle control mechanism, interlockingly connected to control arms linked with swash plates of the hydraulic pump and the hydraulic motor of the HST, is interlocked with the shift operating interlock rotary sleeve;

the swash plate slant angle control mechanism rotatably supports a first arm interlockingly connected through a first link to the control arm of the hydraulic motor and a second arm interlockingly connected through a second link to the control arm of the hydraulic pump, and a rotary member on a same axis;

the rotary member is connected through one link to the shift operating interlock rotary sleeve and is rotated forward and rearward following the forward and rearward rotation of the shift operating interlock rotary sleeve;

the first arm is rotated integrally with the rotary member and is in parallel to the first link when neither the forward traveling pedal nor the rearward traveling pedal are treaded so as to move the first link when either the forward traveling pedal or the rearward traveling pedal is treaded; and the second arm is interlocked with the rotary member so that the second arm is rotated to move the second link toward one side when the forward traveling pedal is treaded and to move the second link toward other side when the rearward traveling pedal is treaded.

2. The shift operating device of the traveling vehicle as set forth in claim 1, wherein the forward traveling pedal and the rearward traveling pedal are pivotally connected to a rotary support shaft supported by the installation plate.

3. The shift operating device of the traveling vehicle as set forth in claim 2, wherein a neutral position return mechanism, which returns the forward traveling pedal and the rearward traveling pedal to a position at which tread amount is zero, is connected between the shift operating interlock rotary sleeve and the rotary member of the swash plate slant angle control mechanism.

4. The shift operating device of the traveling vehicle as set forth in claim 1, wherein a neutral position return mechanism, which returns the forward traveling pedal and the rearward traveling pedal to a position at which tread amount is zero, is connected between the shift operating interlock rotary sleeve and the rotary member of the swash plate slant angle control mechanism.

5. The shift operating device of the traveling vehicle as set forth in claim 1, wherein a brake operation device is arranged on the installation plate.

6. The shift operating device of the traveling vehicle as set forth in claim 1, wherein an angle regulation member regulating an extent of rotary angle of the second arm is provided in the swash plate slant angle control mechanism.

7. The shift operating device of the traveling vehicle as set forth in claim 6, wherein the swash plate slant angle control mechanism is characterized in that:

a holding part holding the second arm is provided in the rotary member;

a biasing member, biasing the second arm along the rotary direction in the case of treading when either the forward traveling pedal or the rearward traveling pedal is treaded, is interposed between the rotary member and the second arm;

the angle regulation member regulates an extent of rotary angle of the rotary member along the biasing direction of the biasing member;

the second arm is held by the holding part when neither the forward traveling pedal nor the rearward traveling pedal are treaded;

when either the forward traveling pedal or the rearward traveling pedal is treaded, the second arm is rotated by biasing force of the biasing member following the rotation of the rotary member until regulated by the angle regulation member, and after the regulation of the second aim by the angle regulation member, the rotary member is rotated by treading the pedal further so that the holding part releases the second arm; and when the other of the forward traveling pedal or the rearward traveling pedal is treaded, the holding part pushes the second arm against the biasing member by the rotation of the rotary member.

\* \* \* \* \*